United States Patent [19]

Zimmerman, III

[11] Patent Number: 5,299,102
[45] Date of Patent: Mar. 29, 1994

[54] VEHICLE MARKER LIGHT AND ADVERTISEMENT ILLUMINATOR

[76] Inventor: George Zimmerman, III, 510 E. 200 South, Logan, Utah 84321

[21] Appl. No.: 955,601

[22] Filed: Oct. 2, 1992

[51] Int. Cl.⁵ .............................................. B60Q 1/26
[52] U.S. Cl. ................................. 362/83.3; 362/240; 362/812; 40/556; 40/590; 40/591
[58] Field of Search ............... 362/61, 80, 83.3, 812, 362/240; 40/556, 590, 591

[56] References Cited

U.S. PATENT DOCUMENTS

| | | | |
|---|---|---|---|
| 1,390,561 | 9/1921 | Kelly | 362/812 |
| 1,416,467 | 5/1922 | Hobbs | 362/80 |
| 1,961,865 | 6/1934 | Remington | 362/812 |
| 4,905,126 | 2/1990 | Faia | 362/61 |

Primary Examiner—Richard R. Cole
Attorney, Agent, or Firm—Skjerven, Morrill, MacPherson, Franklin & Friel

[57] ABSTRACT

A vehicle illuminator is provided which acts as a conventional marker light, and additionally illuminates advertisements on the surface of a vehicle. To allow both functions to be performed by a single illuminator, at least one bulb, a reflector, and a transparent insert are combined with one or more conventional marker lights. Light from at least one additional bulb is reflected through a clear portion of a housing by the reflector, the reflector being positioned such that the reflected light illuminates a selected surface. Thus, the light, in addition to acting as a conventional marker light, illuminates advertisements on vehicle and trailer surfaces, making these advertisements more visible, especially during periods of low visibility.

10 Claims, 4 Drawing Sheets

VEHICLE MARKER LIGHT AND ADVERTISEMENT ILLUMINATOR

FIELD OF THE INVENTION

This invention relates to a marker light for vehicles, such as trucks, trailers, and buses, and in particular, to a marker light that additionally provides illumination of advertisements on the surface of a vehicle.

BACKGROUND OF THE INVENTION

Many vehicles, such as trucks, trailers, and buses, are adorned with advertisements. These advertisements are readily visible under ideal circumstances, but are difficult to see at night and during other periods of low visibility. While conventional marker lights render vehicles more visible, they are not designed to illuminate vehicle surfaces, such as the front, sides, and back of trucks, trailers, and buses, and therefore do not effectively illuminate advertisements placed on such vehicle surfaces.

Prior art marker lights on the sides and backs of trucks, trailers, and buses are often recessed to ensure that these lights do not cause the trucks, trailers, and buses to exceed maximum width and length limits. Being recessed, these prior art marker lights cannot illuminate adjacent surfaces. Other prior art marker lights are not recessed, but are not designed to effectively illuminate vehicle surfaces. Therefore, prior art marker lights are not appropriate or suitable for illuminating advertisements on the front, sides, and back of vehicles.

Accordingly, there is a need for a light capable of lighting the front, sides and back of a vehicle, such as a truck, trailer, or bus, while at the same time adding minimal width and length to the vehicle.

SUMMARY OF THE INVENTION

The present invention provides an improved marker light that, in addition to functioning as a conventional marker light, illuminates adjacent areas on the surface of a vehicle, such as a truck, trailer, or bus. Moreover, the improved marker light is advantageously thin. Thus, this improved marker light illuminates advertisements or other material placed on the sides of a vehicle such as a truck, trailer, or bus while adding minimally to the dimensions of the vehicle.

One embodiment of the present invention includes all the elements of a conventional marker light, such as a housing, marker bulbs, and a colored translucent housing cover, plus, in accordance with this invention, an additional bulb, a reflector, and a section of transparent material in the cover. The additional elements are arranged so that when the light is placed adjacent the vehicle side to be illuminated, light from the additional bulb is reflected through the transparent portion of the housing cover by the reflector, and onto the vehicle's surface to illuminate the desired material.

By providing illumination from one or more lights in accordance with the above arrangement, advertisements placed on a vehicle's surface may be seen during periods of low visibility. Since a significant percentage of commercial transportation takes place after dark, providing illumination for advertisements on vehicles results in a substantial increase in the time an advertisement is exposed to the public. Moreover, the resulting increase in illuminated area renders vehicles more visible, and therefore enhances the safety provided by conventional marker lights.

If desired, the light of this invention can be spaced from the side of the vehicle by use of a spacer to provide better illumination. A spacer is particularly useful if the vehicle side is corrugated. Naturally, the spacer must be such that vehicle width and length limits are not exceeded.

The above and other objects, features, and advantages of the present invention will become apparent from the following detailed description and drawings.

DETAILED DESCRIPTION OF THE DRAWINGS

Figure 1:
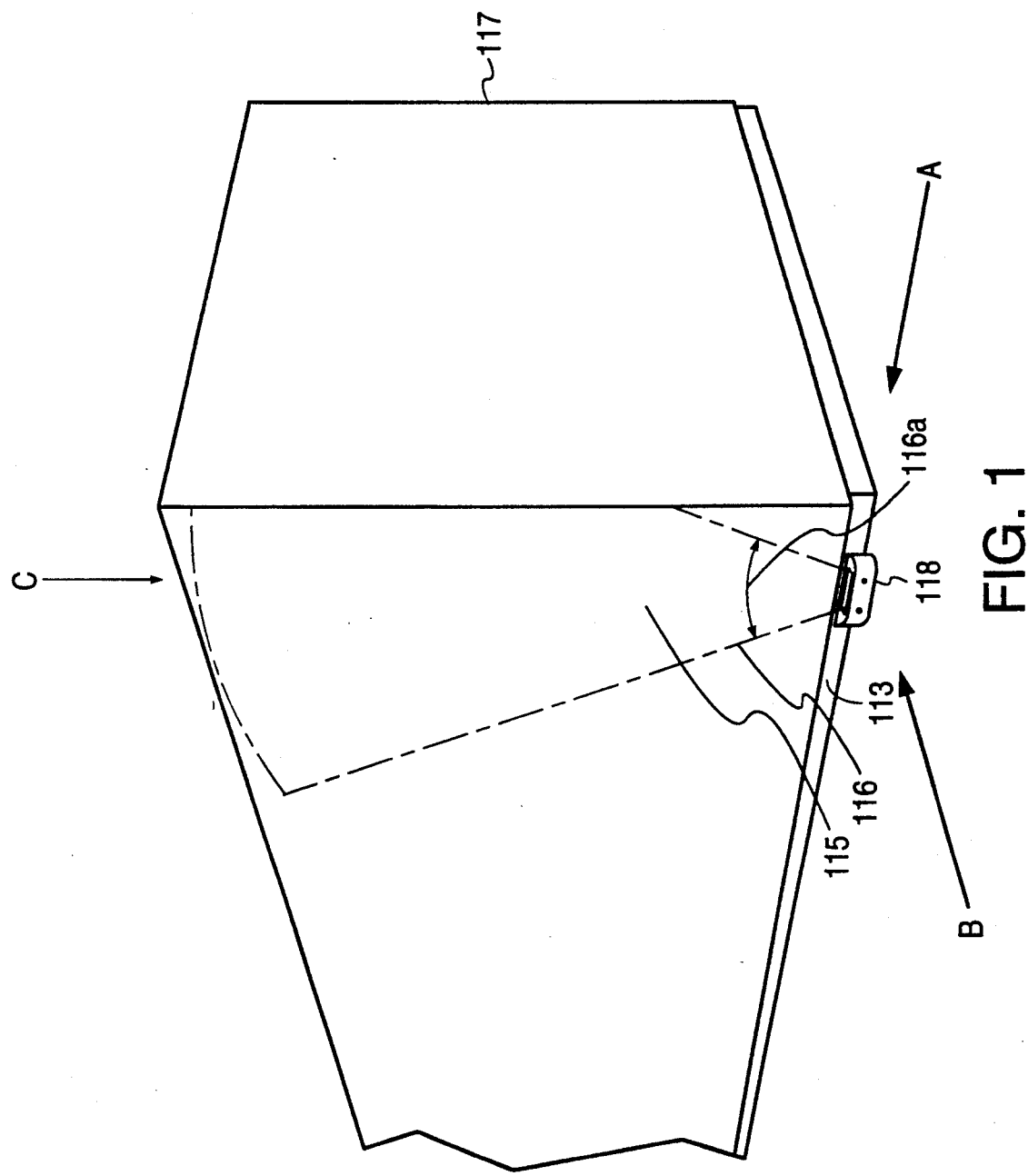
FIG. 1 shows a perspective view of a light of the present invention mounted to a vehicle, such as a truck or trailer.

FIG. 1 is a perspective view of the preferred embodiment of the light 118 of this invention (sometimes referred to as the "Ad-Lite") attached to the surface of a vehicle 117, such as a truck, bus or trailer. Axes A, B, and C are defined in FIG. 1 to clarify the directions of view of the other figures.

Figure 2:
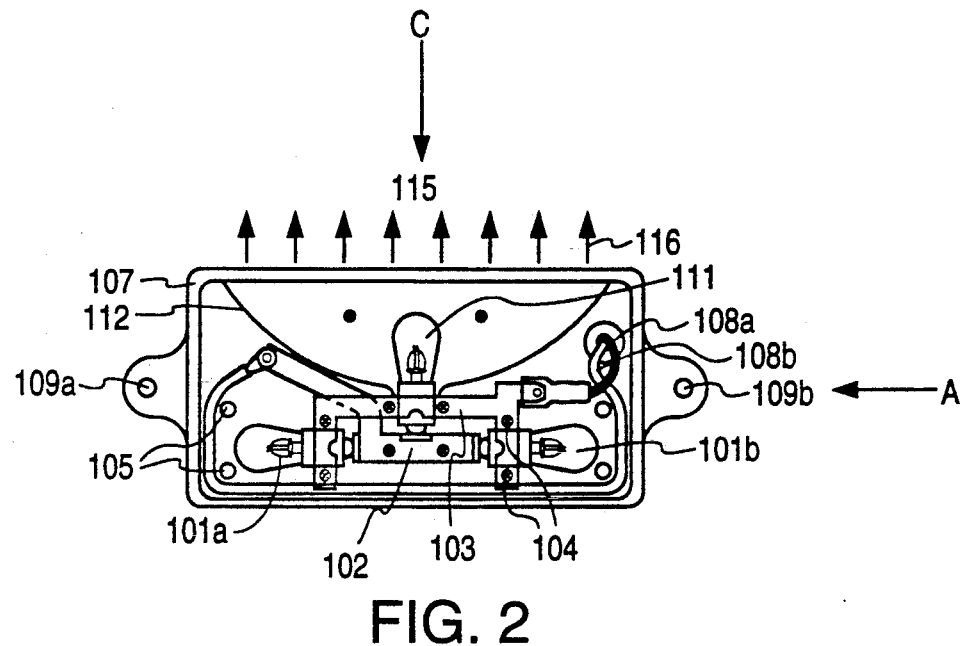
FIG. 2 shows the internal structure of one embodiment of the present invention as viewed along the B axis in FIG. 1.

FIG. 2 shows the housing 107 and the internal structure of the light 118, as viewed along the B axis in FIG. 1, in accordance with a preferred embodiment of the present invention. Wires 108a and 108b are power lines that connect to positive plate 102 and negative plate 103, respectively. Posts 105 (typically plastic but of any suitable material) are provided to guide and secure power wires 108a and 108b. The positive plate 102 and the negative plate 103 are held in place using insulating melt fasteners 104 (typically plastic but of any suitable material), and provide support for the illumination bulb 111 (i.e. the bulb which illuminates the advertisement or other material) and marker bulbs 101a and 101b.

The housing 107 includes the reflector 112, which is used to direct light 116 produced by illumination bulb 111 through the transparent insert 110a (FIGS. 3 and 5) and onto the adjacent vehicle surface 115. Referring to FIGS. 1 and 2, the reflector 112 is positioned such that the beam produced by illumination bulb 111 is substantially parallel to the C axis, but angled slightly toward the vehicle so that the beam is incident on the vehicle surface 115 to be illuminated. The reflector 112 is provided with a curvature that results in a wide beam angle 116a (FIG. 1) as viewed from the B axis, and a relatively narrow beam angle as viewed from the A axis (FIG. 4). This configuration allows for substantial illumination of the vehicle surface 115 (FIG. 1) as shown in FIGS. 1 and 6.

If power is applied to positive plate 102 (FIG. 2) and negative plate 103 of the present invention via wires 108a and 108b, respectively, marker bulbs 101a and 101b and illumination bulb 111 emit light. The light from marker bulbs 101a and 101b shines through the red lexan portion 110b (FIG. 3) of housing cover 110, and therefore light 118 functions as a conventional marker light. Light from the illumination bulb 111 is reflected through the clear lexan portion 110a (FIGS. 3 and 5) of the housing cover 110 by reflector 112, which is positioned so that the reflected light shines on the adjacent surface 115. As shown in FIG. 6, by p)acing one or more lights 118 along the edges of a vehicle, advertisements on one or more sides of the vehicle are effectively illuminated.

Figure 3:
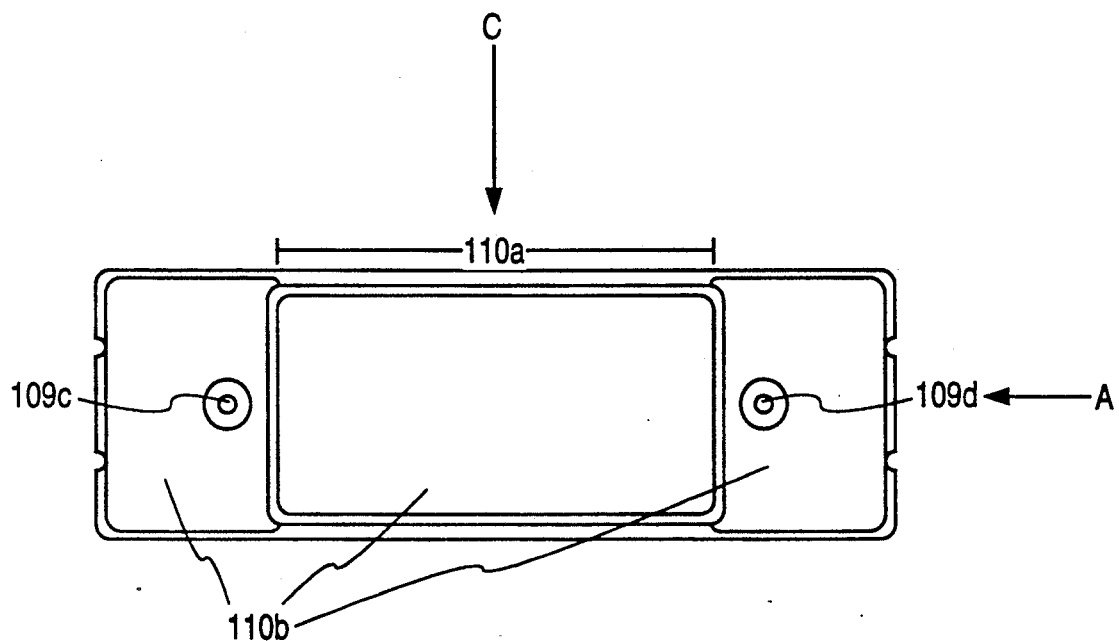
FIG. 3 shows the housing cover of one embodiment of the present invention as viewed along the B axis in FIG. 1.
Figure 4:
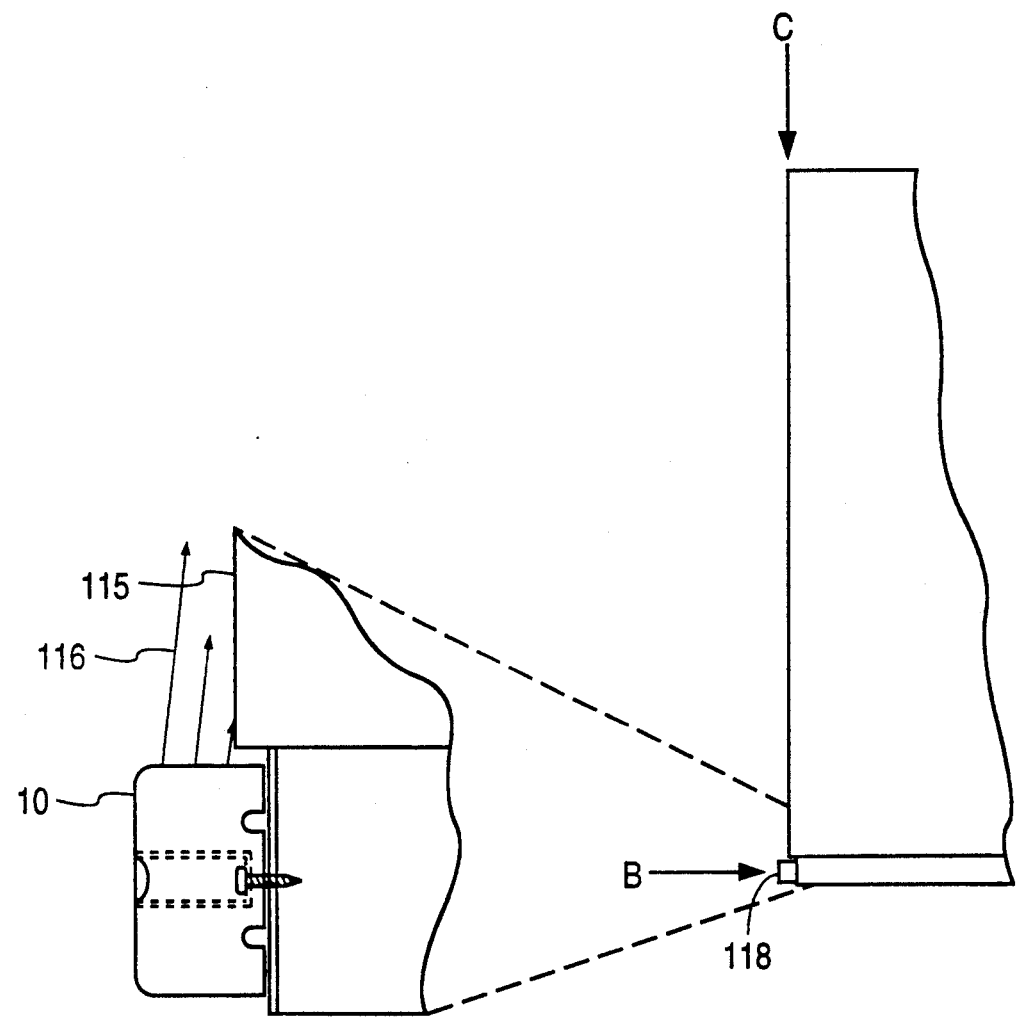
FIG. 4 shows, in a regular and enlarged view, the housing cover of a one embodiment of the present invention as viewed along the A axis in FIG. 1.
Figure 5:
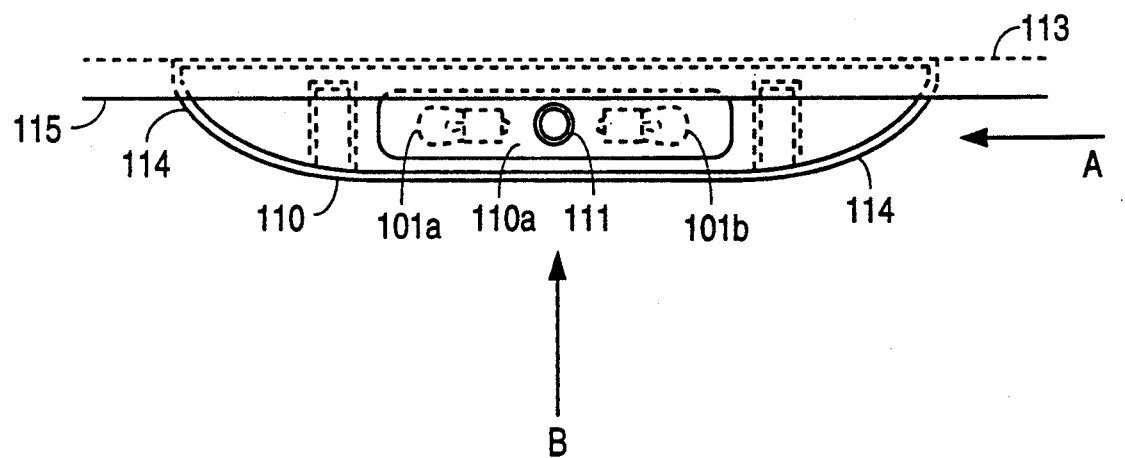
FIG. 5 shows the housing cover of one embodiment of the present invention as viewed along the C axis in FIG. 1.
Figure 6:
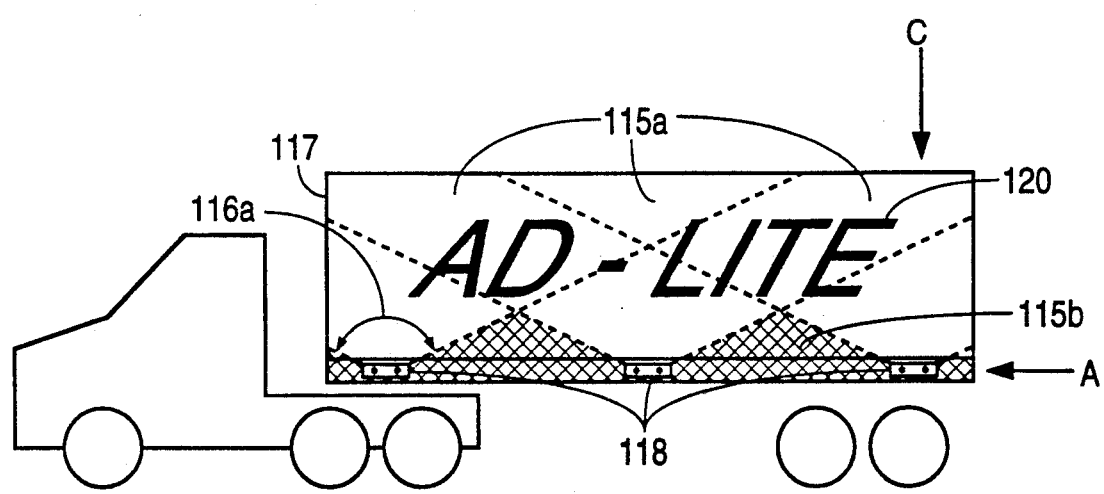
FIG. 6 shows a vehicle, as viewed along the B axis in FIG. 1, with an advertisement "AD-LITE" illuminated by the overlapping beams of three lights of the present invention.

The housing cover 110, as shown in FIGS. 3-5, typically consists of red lexan 110b with a clear lexan insert 110a on the portion of structure 118 through which light passes to illuminate a surface such as surface 115 (FIGS. 1 and 4). The red lexan 110b serves to diffuse light emitted by the marker bulbs 101a and 101b, and to filter the light so as to provide light of a specified color. In this embodiment, the colored portion 110b of the housing cover 110 is red, but any color may be used. The clear lexan insert 110a allows the full spectrum of light given off by illumination bulb 111 to reach the adjacent surface 115, thus avoiding the color filtering and the decrease in intensity that result when light passes through a colored filter. Of course, the insert may be colored or textured to provide a desired effect.

For efficient aerodynamics, and to conform with laws concerning vehicle and trailer width, thin marker lights are desirable. Because illumination bulb 111 typically has the same diameter as marker bulbs 101a and 101b, the addition of the illumination light, as shown in FIG. 5, does not necessitate an increase in the thickness of the marker light. Moreover, the present invention provides an efficient aerodynamic shape 114 (i.e., a curved outer surface tapering outward from the surface 113, then running parallel to this surface for a short distance and then tapering back to surface 113), as shown in FIG. 5, to minimize aerodynamic drag. Naturally, other appropriate shapes can also be used.

Referring to FIGS. 4 and 5, if the surface 113 is too deeply recessed with respect to the surface 115 to allow proper illuminating coverage of the surface 115, a spacer may be provided between the light 118 and the surface 113 to position the light 118 so as to provide effective illuminating coverage of the vehicle surface 115. A spacer is particularly effective in providing adequate lighting of surface 115 if the vehicle surface 115 is corrugated.

Holes 109c and 109d, and holes 109a and 109b, are used to secure the housing cover 110 to the housing 107, and to attach the entire structure 118 to the lower portion 113 of surface 115 of a vehicle, as shown in FIGS. 3 and 2, respectively. The distances between holes 109a and 109b, and between holes 109c and 109d, are selected to match the spacing of conventional marker lights, making it easy to retrofit the new light onto vehicles with existing marker lights.

FIG. 6 shows a view along the B axis in FIG. 1 of a vehicle 117 with an advertisement 120 illuminated by the overlapping beams of three lights 118 configured in accordance with a preferred embodiment of the present invention. These lights are positioned such that the clear lexan inserts 110a are facing upward along the C axis in FIG. 1. The reflector 112 is positioned in each light 118 such that the beam created by illumination bulb 111 in each light 118 is incident upon a corresponding portion of the vehicle surface 115, as shown in FIG. 1. Thus, an area 115a of the surface 115, which includes the advertisement 120, is illuminated.

Referring again to FIG. 6, the overlapping of the three shown wide angle beams 115a allows for substantial illuminating coverage of the vehicle surface 115. If greater coverage is desired, more lights 118 may be added. For example, additional lights 118 configured in accordance with the present invention may be placed along the top edge of the vehicle surface 115 shown in FIG. 6, and positioned with clear lexan inserts 110a facing downward along the C axis. Such an arrangement would reduce the size of the area 115b not illuminated.

The above description of the invention is illustrative and not limiting. Other embodiments of this invention will be apparent to one of ordinary skill in the art in light of the above disclosure.

I claim:

1. A surface illuminator suitable for illuminating a vehicle surface, said illuminator comprising a housing attachable to said vehicle surface, said housing including:
 a housing cover which provides protection for the interior of said illuminator and selectively passes light of a particular color, said cover including a transparent insert;
 one or more marker bulbs positioned inside said housing such as to emit light through a colored portion of said housing cover; and
 at least one dedicated surface illuminating bulb positioned inside said housing to emit light through said transparent insert of said housing cover, said housing including means separating said one or more marker bulbs and said surface illuminating bulb so as to allow said surface illuminating bulb to act primarily to illuminate at least a portion of said vehicle surface.

2. Structure as in claim 1 wherein said housing cover is formed such that aerodynamic drag is reduced.

3. Structure as in claim 1 including means for providing support for said marker bulbs and said dedicated surface illuminating bulb.

4. Structure as in claim 1 including means for attaching said housing and said housing cover to said vehicle surface.

5. Structure as in claim 1 wherein said separating means comprises means for reflecting light from said at least one dedicated surface illuminating bulb through said transparent insert to illuminate at least a portion of said vehicle surface.

6. Structure as in claim 5 wherein said means comprises a concave reflector.

7. Structure as in claim 1 including a spacer between said illuminator and said vehicle surface to allow said illuminator to more effectively illuminate said surface.

8. A surface illuminator suitable for illuminating a vehicle surface, said illuminator comprising a housing attachable to said vehicle surface, said housing including:
 a housing cover which provides protection for the interior of said illuminator and selectively passes light of a particular color, said cover including a transparent insert;

one or more marker bulbs positioned inside said housing such as to emit light through a colored portion of said housing cover;

at least one dedicated surface illuminating bulb positioned inside said housing to emit light through said transparent insert of said housing cover to illuminate at least a portion of said vehicle surface;

means for providing power to said marker bulbs and to said at least one dedicated surface illuminating bulb, wherein said means for providing power provides support for said marker bulbs and said at least one dedicated surface illuminating bulb;

means for attaching said housing and said housing cover to said vehicle surface; and means for reflecting light from said at least one dedicated surface illuminating bulb through said transparent insert wherein said means for reflecting light includes means separating said one or more marker bulbs and said at least one surface illuminating bulb so as to allow said illuminating bulb to act primarily to illuminate at least a portion of said vehicle surface.

9. Structure as in claim 8 wherein said housing cover is formed such that aerodynamic drag is reduced.

10. Structure as in claim 8 wherein said means for reflecting light comprises a concave reflector.

* * * * *